United States Patent
Borg

(10) Patent No.: US 8,279,308 B1
(45) Date of Patent: Oct. 2, 2012

(54) OPTIMIZED LOG ENCODING OF IMAGE DATA

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 376 days.

(21) Appl. No.: 12/512,846

(22) Filed: Jul. 30, 2009

(51) Int. Cl.
*H04N 5/20* (2006.01)
*H04N 5/235* (2006.01)

(52) U.S. Cl. .................... 348/255; 348/230.1

(58) Field of Classification Search .......... 348/229.1, 348/230.1, 255
See application file for complete search history.

(56) References Cited

U.S. PATENT DOCUMENTS

| | | | |
|---|---|---|---|
| 5,949,478 A * | 9/1999 | Kunishige | 348/96 |
| 6,529,927 B1 * | 3/2003 | Dunham | 708/400 |
| 6,567,124 B1 * | 5/2003 | Tran | 348/255 |
| 6,646,246 B1 | 11/2003 | Gindele et al. | |
| 6,765,611 B1 | 7/2004 | Gallagher et al. | |
| 6,867,717 B1 | 3/2005 | Ion et al. | |
| 2003/0081846 A1 * | 5/2003 | Whitehead | 382/239 |
| 2005/0117799 A1 * | 6/2005 | Fuh et al. | 382/169 |
| 2006/0119712 A1 * | 6/2006 | Yamamoto et al. | 348/229.1 |
| 2006/0181721 A1 | 8/2006 | Kulkarni et al. | |
| 2008/0007748 A1 | 1/2008 | Borg et al. | |
| 2008/0267608 A1 * | 10/2008 | Kubota | 396/374 |

OTHER PUBLICATIONS

Wikipedia, the free encyclopedia, "Lambert W function" retrieved Jul. 9, 2009, http://en.wikipedia.org/wiki/Lambert_W_function.
Cinesite Digital Film Center, Grayscale Transformations of Cineon Digital Film Data for Display, Conversion, and Film Recording, Version 1.1, Apr. 12, 1993.

* cited by examiner

*Primary Examiner* — Tuan Ho
*Assistant Examiner* — Shahbaz Nazrul
(74) *Attorney, Agent, or Firm* — Schwegman Lundberg Woessner P.A.

(57) ABSTRACT

Systems and methods ("utility") for encoding digital linear image data into encoded image data. The utility may be included as part of a digital image capture device, such as a digital camera or a film scanner. The utility may include an encoder module that is operative to encode digital linear image data into encoded data according to an enhanced transfer function. The transfer function includes a linear portion and a logarithmic portion separated by a breakpoint. The transfer function may be continuous and continuously differentiable at the breakpoint. Further, the transfer function may operate to reduce the bit depth of the image data (e.g., from 12 bits to 10 bits, or the like) to provide compression for the image data.

20 Claims, 6 Drawing Sheets

OPTIMIZED LOG ENCODING OF IMAGE DATA

BACKGROUND

1. Field

The present disclosure relates, in general, to imaging systems, and, more particularly, to improved systems and methods for encoding digital image data in imaging systems.

2. Relevant Background

Digital image capture devices, which may include digital cameras, film scanners, or the like, are often utilized to capture still or moving scenes. For example, in the motion picture industry, sources of image data can include live footage (e.g., captured on camera negative film and digitized in a film scanner, or captured with digital motion picture cameras). Similarly, a digital camera may produce digital image data by capturing a still or moving scene.

Generally, most digital image capture devices incorporate an electronic sensor that includes an array of photo detectors that convert photons that strike them into electrons providing a signal at each pixel proportional to the number of photons, or the amount of light at each pixel. Presently, most digital cameras employ charge coupled device (CCD) or complementary metal oxide semiconductor (CMOS) sensors. When subjected to light, a photodiode of the image sensor converts incident photons into electrons. This conversion enables analog electronic circuitry to process the image "seen" by the sensor array. The electrons gathered by the sensors may be stored in small capacitors that may be read out as a series of varying voltages, which are proportional to the image brightness. An analog to digital converter (ADC or A/D) may be operative to convert the series of varying voltages into corresponding digital values of digital image data. For example, an ADC may convert the series of voltage levels into binary numbers having 10 to 12 hits, or 1024 to 4096 different discernible levels, and the digital values produced by the ADC may be nearly linear with respect to the intensity of the incident light detected by the sensor.

SUMMARY

The following embodiments and aspects thereof are described and illustrated in conjunction with systems, tools, and methods which are meant to be exemplary and illustrative, and not limiting in scope. Often, it may be advantageous to convert the linear digital values from an ADC of a digital imaging system to another form. For example it may be advantageous to encode (or transform) the linear values into a form such that the bit depth is reduced (e.g., from 12 bits down to 10 bits) to provide data compression. Generally, digital imaging systems with a limited number of bits may be designed so that there is enough precision in the lower light levels (e.g., darker levels) to avoid visible contouring. This may be achieved by applying a logarithmic or gamma law correction (or encoding) to the linear data. With this correction, the number of bits required to eliminate contouring in a display may be reduced from 12 bits per linear data to 8 to 10 bits for logarithmic or gamma corrected data.

Improved systems and methods for encoding or transforming digital linear image data (e.g., data representing one or more physical scenes) into encoded image data are described herein. The systems and methods may be included as part of a digital image capture device, such as a digital camera, a film scanner, or the like. For example, an exemplary system may include an encoder module that is operative to encode digital linear image data into encoded data according to an enhanced transfer function. The transfer function may include a linear portion for relatively low brightness levels and a logarithmic portion for relatively high brightness levels, the linear and logarithmic portions being separated by a breakpoint. In this regard, the linear portion may enable all of the encoded values at the lower levels to be utilized. Further, the transfer function may be continuous and continuously differentiable at the breakpoint, thereby providing a smooth transition between the linear and logarithmic portions. In addition, the encoding scheme may operate to reduce the bit depth of the image data (e.g., from 12 bits to 10 bits, or the like) to provide data compression for the image data, which may permit the image data to be stored and/or transmitted more efficiently. Furthermore, by using a logarithmic transfer function for the higher light levels, the number of encoded values per doubling of the exposure level (e.g., per "stop") may be constant.

According to a first aspect, a computer-implemented method for encoding linear image data into encoded data is provided. The method includes receiving linear image data from an image data source, the image data including a plurality of input values each having a value between a minimum input value and a maximum input value. The method further includes generating encoded image data by, for each input value, determining a corresponding output value according to a transfer function, each output value having a value between a minimum output value and a maximum output value. Additionally, the transfer function includes a linear portion and a logarithmic portion and is continuous at a breakpoint separating the linear portion from the logarithmic portion. Further, the method includes storing the encoded image data in a data storage device.

According to a second aspect, a system is provided that includes an image capturing module operative to sense a light image of a scene and to generate digital linear image data that includes a plurality of linear pixel data. The system also includes an encoder module operative to receive the digital linear image data and to encode the linear pixel data of the digital linear image data into encoded data according to a transfer function. Further, the transfer function includes a linear portion and a logarithmic portion, and is continuous at a breakpoint separating the linear portion from the logarithmic portion. The system further includes a storage module for storing the encoded data.

According to a third aspect, a computer readable medium for encoding digital linear image data into encoded data is provided. The computer readable medium includes computer readable program code devices configured to cause a computer to receive digital linear image data that includes a plurality of linear pixel data. The computer readable medium also includes computer readable program code devices configured to cause the computer to determine an output value for each of the plurality of linear pixel data to generate encoded image data. The output values are determined according to a transfer function that includes a linear portion and a logarithmic portion, and is continuous at a breakpoint separating the linear portion from the logarithmic portion.

In addition to the exemplary aspects and embodiments described above, further aspects and embodiments will become apparent by reference to the drawings and by study of the following descriptions.

DETAILED DESCRIPTION

Various embodiments of systems and methods for encoding or transforming digital linear image data (e.g., data representing one or more physical scenes) into encoded image data are described herein. The embodiments may be included as part of a digital image capture device, such as a digital camera or a film scanner. For example, a system may include an encoder module that is operative to encode digital linear image data into encoded data according to an enhanced transfer function. The transfer function may include a linear portion and a logarithmic portion separated by a breakpoint. Further, transfer function may be continuous and continuously differentiable at the breakpoint, and may operate to reduce the bit depth of the image data (e.g., from 12 bits to 10 bits, or the like) to provide data compression. The specific features of various embodiments are described below with reference to FIGS. 1-6.

Figure 1:
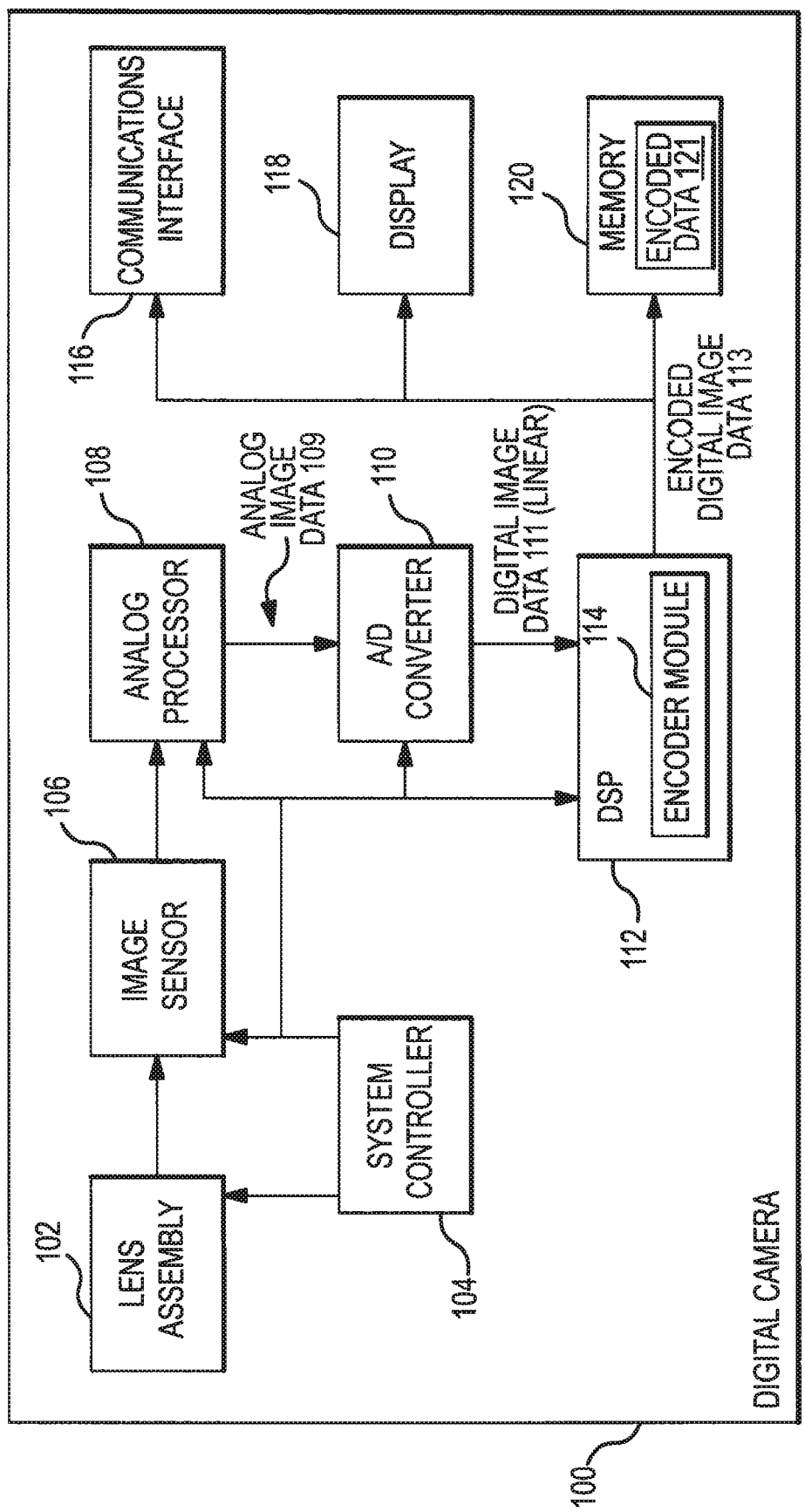
FIG. 1 illustrates in functional block form an exemplary digital camera that includes an enhanced encoder module for encoding digital image data.

FIG. 1 illustrates a block diagram of an exemplary digital camera 100 that includes an encoder (or converter) module 114 operative to implement enhanced encoding schemes for encoding or transforming digital linear image data into encoded digital image data. In general, the digital camera 100 includes optical and mechanical subsystems (e.g., a lens assembly 102), an image sensor 106, and an electronic subsystem. The electronic subsystem may include analog processing components (e.g., an analog processor 108), digital processing components (e.g., an A/D converter 110, a digital signal processor (DSP) 112, and the like), and a system controller 104. A display 118, memory 120, a communications interface 116, and various other components may also be included in the digital camera 100.

The lens assembly 102 may include one or more lenses, filters, a shutter and diaphragm, and the like, that operate to focus light on the image sensor 106. The image sensor 106 may be a charge coupled device (CCD), a complementary metal oxide semiconductor (CMOS) sensor, or any other suitable image sensor. The image sensor 106 may include an array of photo detectors operative to convert photons that strike them into electrons, and to provide a signal for each pixel that is proportional to the number of photons, or the intensity of light at each pixel. To facilitate the collection of light to capture a physical scene, the image sensor 106 may include a small lens like structure (e.g., a micro-lens) covering each pixel, which may be formed by a layer of photoresist placed over the pixel plane. Additional details regarding the image sensor 106 are provided below with reference to FIG. 2.

The output signals of the image sensor 106 may be analog voltage signals, which may be processed in the analog processor 108. For example, sample and hold, color separation, automatic gain control, and other analog signal processing may be applied in the analog processor 108, before the analog signals 109 are converted to digital signals by the A/D converter 110. The resulting digital signals 111 from the A/D converter 110 may each be represented by a predetermined number of bits (e.g., 10 bits, 12 bits, 14 bits, or the like).

The digital output signals 111 of the A/D converter 110 may then be processed by the digital signal processor (DSP) 112. The DSP 112 may be operative to apply various types of processing, including tone adjustment, RGB to YCC color conversion, white balance, image encoding using the encoder module 114, and the like. Further, image signals to be used for automatic exposure control, autofocus, and automatic white balance may also be generated in the DSP 112.

The system controller 104 may be operative to control the sequence of the camera operation, such as automatic exposure control, autofocus, and the like. For example, before taking a picture, the system controller 104 may quickly read sequential image signals from the image sensor 106, while adjusting the exposure parameters and focus. When the signal levels settle in a certain range, the system controller 104 may determine that proper exposure has been accomplished. Similarly, for autofocus, the system controller 104 may analyze the image contrast and adjust the focus of the lens assembly 102 to maximize this image contrast.

The digital camera 100 also includes the display 118 (e.g., an LCD display) and the communications interface 116. The communications interface 116 may be any suitable wired and/or wireless interface operative to couple the digital camera 100 with an electronic device, such as a computer. For example, the communications interface 116 may include a USB interface. The digital camera 100 also includes memory 120 that stores the encoded data 121 (e.g., in one or more image files), which may be removable, fixed, or any combination thereof. For example, the memory 120 may include a removable memory card (e.g., a removable flash memory card), magnetic or optical storage, or the like.

As noted above, the DSP 112 includes the encoder module 114 that is operative to encode digital linear image data 111 from the A/D converter 110 into encoded digital image data 113 according to embodiments described herein below. That is, the encoder module 114 may be operative to transform linear image data 111 which represents a physical scene into encoded digital image data 113. It should be appreciated that the digital camera 100 shown in FIG. 1 is provided for exemplary purposes, and that the encoder module 114 may be implemented in other devices as well. For example, the encoder module 114 may be included as part of a film scanner. In typical motion picture workflows, a scene may be captured by a film camera on camera negative film. The camera negative film may then be scanned by a digital film scanner and then encoded according to the enhanced schemes as provided herein. The encoded image data may then be edited using a suitable editor or further processed in any desirable manner.

Figure 2:
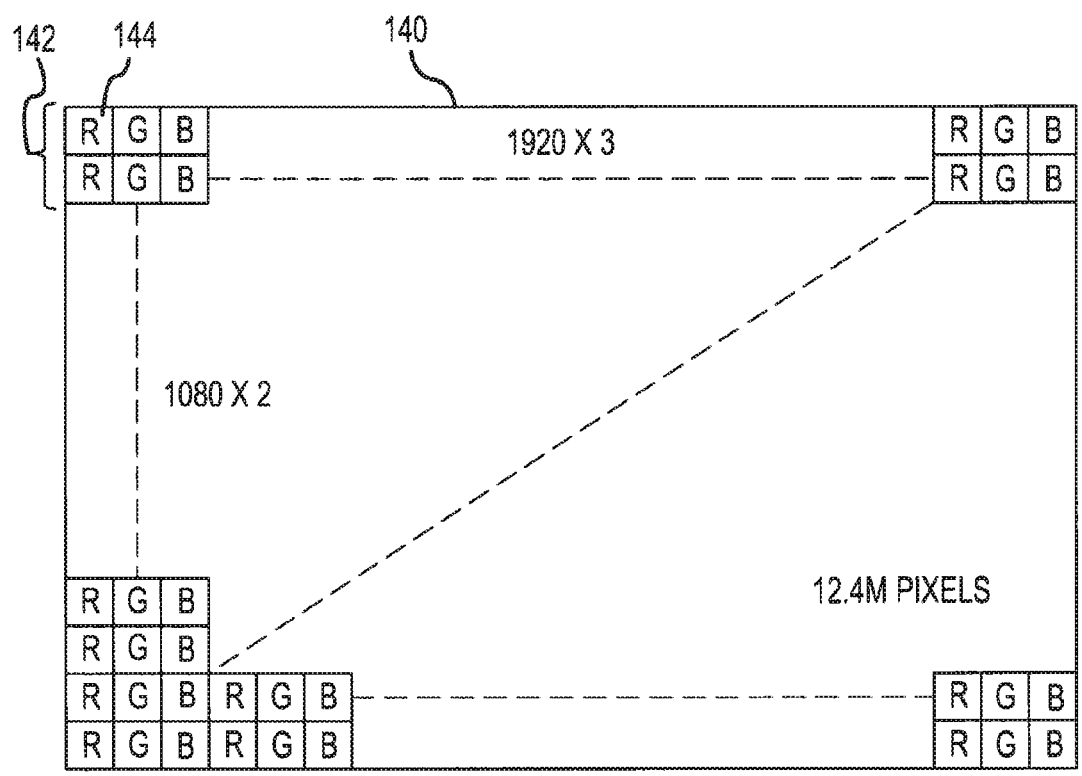
FIG. 2 illustrates a charged coupled device (CCD) that may be incorporated in the digital camera shown in FIG. 1.

FIG. 2 illustrates a layout for an exemplary CCD 140 that may be used to provide analog image data 109 to an A/D converter, such as the A/D converter 110 shown in FIG. 1. Generally, the image sensors used in digital imaging are monochrome devices, having no color discriminating ability associated with each detector. For this reason, the sensors employ a color filter array (CFA) inserted between the micro-lens and the active portion of the CCD (e.g., the photo diodes). The CFA may be constructed to assign a single color to each pixel. A variety of CFA architectures may be used, and are usually based on different combinations of primary colors (e.g., Red, Green, and Blue) or complementary colors (Cyan, Magenta, and Yellow). Regardless of the particular CFA used, the overall objective may be to transfer only a single color of interest, so that each pixel "sees" only one color wavelength band.

In the CCD 140 shown in FIG. 2, a plurality of macro cells 142 is arranged in a 1920×1080 array. Each macro cell 142 includes six unit sells or pixels 144 (e.g., 2 Red unit cells, 2 Green unit cells, and 2 Blue unit cells per macro cell 142), for a total of about 12.4 million pixels 144. As noted above, when subjected to light, the CCD 140 converts incident photons at each pixel 144 into electrons. This conversion enables analog electronic circuitry to process the image detected by each pixel 144 in the sensor array of the CCD 140. An A/D converter, such as the A/D converter 110 shown in FIG. 1, may then be used to convert the series of varying voltages that correspond to the intensity of light incident at each pixel 144 on the sensor array to digital values. For example, each digital value may be 10 bits, 12 bits, or the like.

Although a particular layout structure for the CCD 140 is shown in FIG. 2, it should be appreciated that other CFA patterns may be used. For example, one popular CFA pattern is referred to as the Bayer pattern, which places red, green, and blue filters over the pixels in a checkerboard pattern that has twice the number of green squares as either red or blue. The general theory behind the Bayer pattern is that the human eye is more sensitive to wavelengths of light in the green region than wavelengths representing red and blue. Therefore, doubling the number of green pixels provides greater perceived luminance information and detail, and better natural color representation for the human eye. Of course, other CFA patterns may be used.

Figure 3:
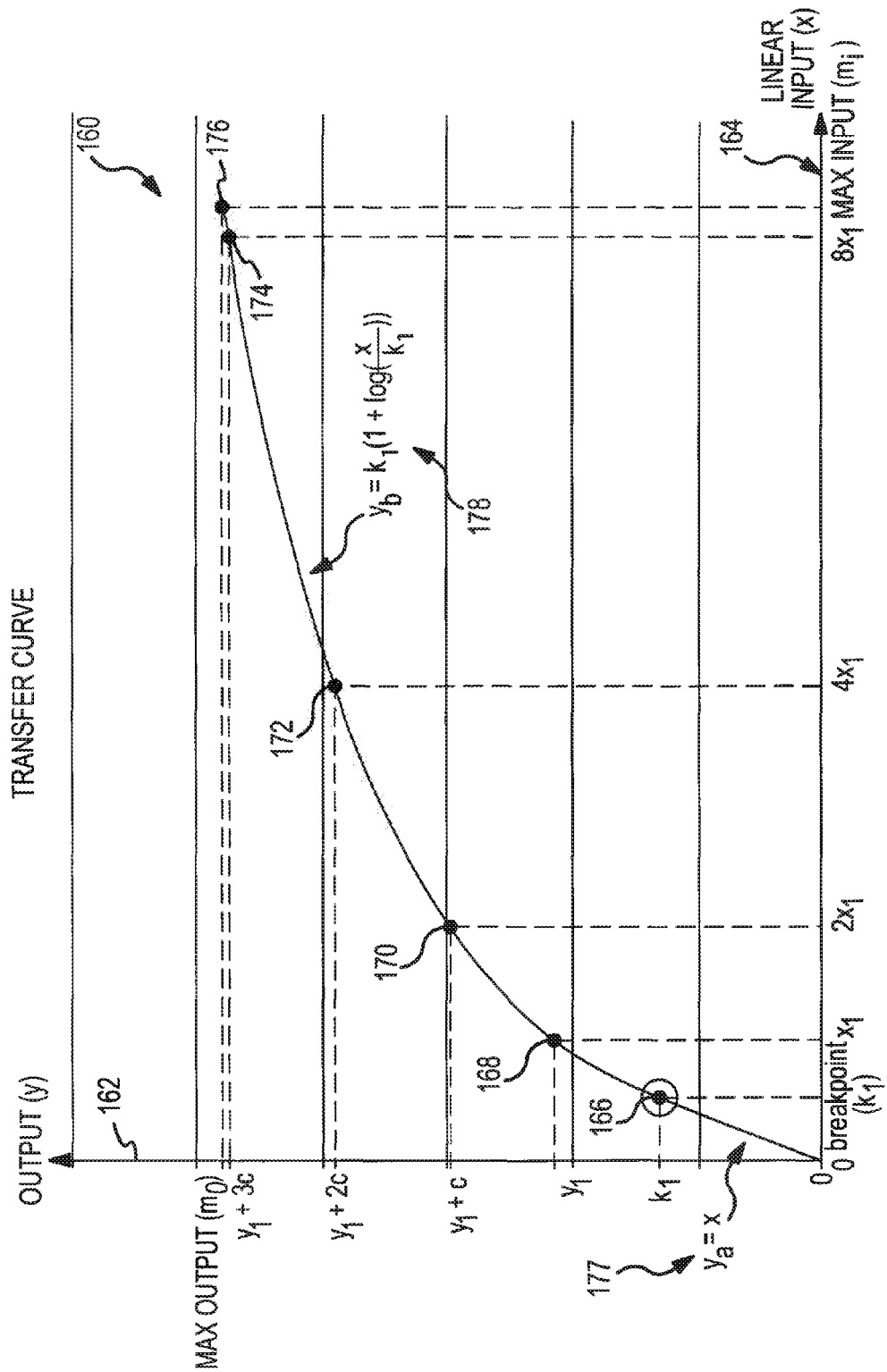
FIG. 3 illustrates an exemplary transfer curve for an enhanced encoding scheme.

FIG. 3 illustrates an exemplary transfer curve 160 that may be used to encode digital linear image data into encoded image data. As an example, the transfer curve 160 may be implemented by the encoder module 114 shown in FIG. 1. It should be appreciated that the transfer curve 160 may be implemented in hardware, software, or any combination thereof. The x-axis 164 represents the linear input values that may, for example, be received from the output of an A/D converter. The y-axis 162 represents the encoded digital output values, and the transfer curve 160 represents the mapping of the input values to the encoded output values. As shown, the transfer curve 160 includes a linear portion 177 and a logarithmic portion 178 that meet each other at an intersection or breakpoint $k_l$ 166.

The linear portion 177 of the transfer curve 160 may provide a 1:1 mapping of the input values to the output values (e.g., the linear portion 177 has the equation $y_a=x$). As can be appreciated, this feature enables all the output code values below the breakpoint 166 to be utilized, with the output code value of zero corresponding to black (no light) and increasing output code values with increasing intensity of light. It should be appreciated that other code values may correspond to black simply by adding an "offset" to the linear portion. Further, the logarithmic portion 178 (in this example, "log" refers to "natural log") of the transfer curve 160 provides several advantageous features. The equation of the logarithmic portion 178 is:

$$y_b=k_l(1+\log(x/k_l))$$

As can be appreciated, this function enables the transfer curve 160 to be continuous at the breakpoint $k_l$ 166. That is, the "y" values for the linear portion 177 and the logarithmic portion 178 are equal at $x=k_l$. This is illustrated by the following equations for the transfer curve 160 at the point $x=k_l$:

$$y_a=k_l$$

$$y_b=k_l(1+\log(k_l/k_l))k_l$$

In addition, the equation for the logarithmic portion 178 is such that the transfer curve 160 is continuously differentiable at a breakpoint 166, thereby providing a smooth transition between the linear portion 177 and the logarithmic portion 178. That is, the derivative (y') of the transfer curve 160 is itself a continuous function at the breakpoint 166. This feature is shown by the following equations for the transfer curve 160 at the point $x=k_l$:

$$y'_b=k_l/k_l=1$$

$$y'_b=k_l/k_l=1$$

In addition to the above features, the equation for the logarithmic portion 178 of the transfer curve 160 is such that the number of output code values per stop (e.g., per doubling of the exposure level) above the breakpoint 166 is constant, thereby maintaining constant image quality independent of the exposure level. For example, during digital image editing, the exposure level may be adjusted up or down by one or more stops or fractions of a stop simply by adding or subtracting a constant value from the encoded output value. This feature is illustrated by the data points 168, 170, 172, 174 on the transfer curve 160, which show that each time the input value doubles (e.g., $x_1$, $2x_1$, $4x_1$, and $8x_1$), the output value is increased by a constant "c."

The value for the breakpoint $k_l$ may be determined so that a maximum value ($m_i$) for the input values maps to the maximum value ($m_o$) for the encoded output values. In this regard, the full dynamic range of the input image data may be preserved in the encoded output values. Since the value of $k_l$ in this case is dependent on the maximum input value $m_i$ and the maximum output value $m_o$, $k_l$ may be determined by substituting $m_i$ for "x" and $m_o$ for "y" in the equation for the logarithmic portion 178 of the transfer curve 160:

$$m_o=k_l(1+\log(m_i/k_l))$$

From the above equation, $k_l$ may be determined to be:

$$k_l=-(m_o)/\text{ProductLog}(-(m_o)/(e*m_i))$$

where "e" is the mathematical constant and ProductLog is the "product log" function (also called the Lambert W function or the Omega function). The ProductLog function is included as a function in the mathematics software Mathematica®, as well as other software programs.

Figure 4:
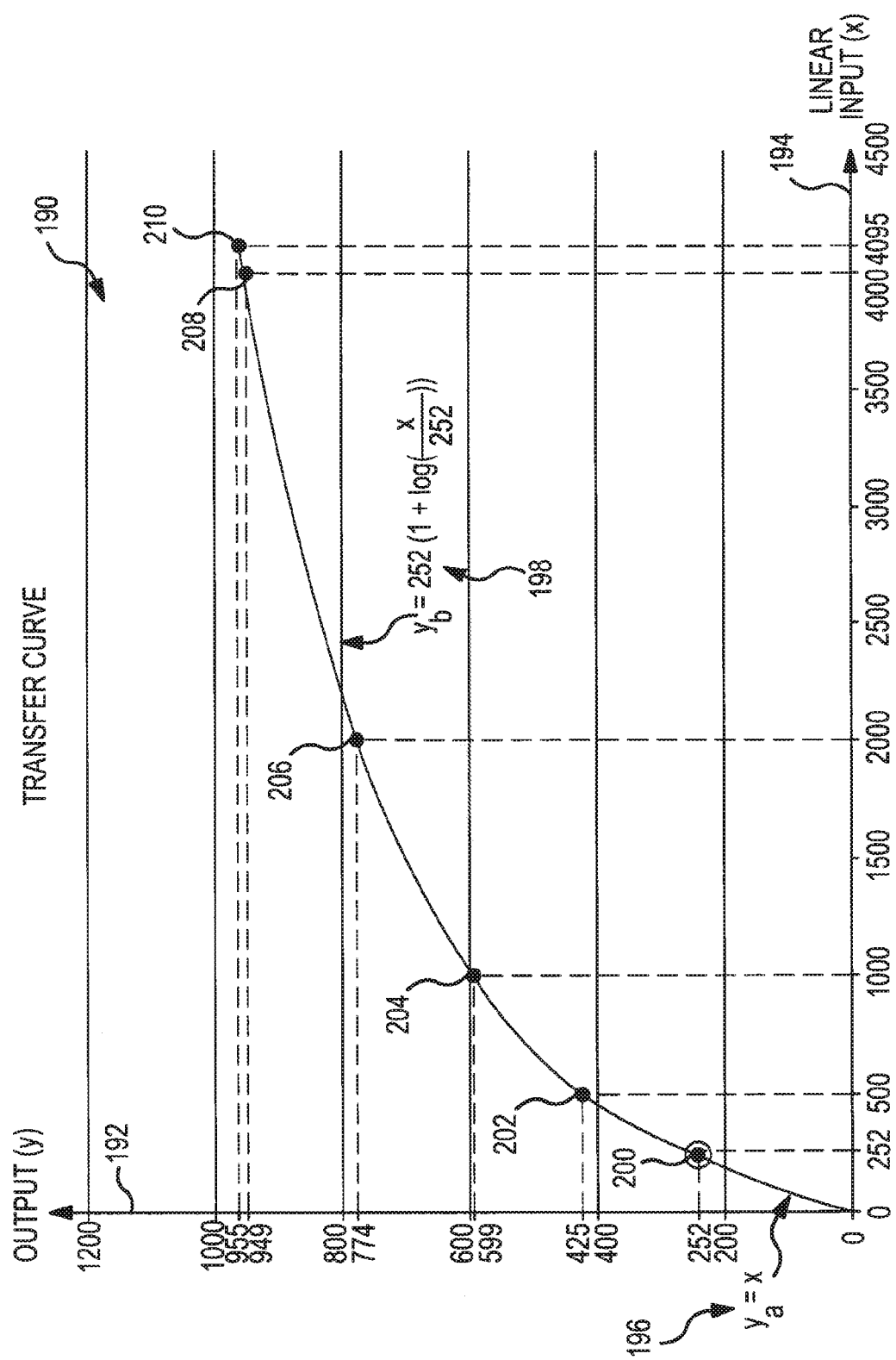
FIG. 4 illustrates another exemplary transfer curve for an enhanced encoding scheme.

FIG. 4 illustrates another exemplary transfer curve 190 similar to the transfer curve 160 shown in FIG. 3. In this example, an encoder module (e.g., the encoder module 114 shown in FIG. 1) utilized to implement the transfer curve 190 is operative to convert 12-bit linear input values (x-axis 194) into 10-bit encoded output values (y-axis 192). As shown by a point 210 on the transfer curve 190, the maximum input value $m_i$ is 4095 and the maximum output value $m_o$ is 955. Using an equation for the logarithmic portion 198 of the transfer curve 190, and mapping the maximum input value 4095 to the maximum output value 955, the breakpoint $k_l$ may be calculated to be 252 (rounded to the nearest integer). That is, the following equation may be solved for $k_l$:

$$955=k_l(1+\log(4095/k_l))$$

$$k_l=(955)/\text{ProductLog}(-(955)/(e*4095))=252$$

Similar to the example shown in FIG. 3, the transfer curve 190 is continuous at the breakpoint 200. That is, the linear portion 196 and the logarithmic portion 198 of the transfer curve 190 have the same "y" value at the breakpoint $k_l$, as shown by the following equations for the transfer curve 190 at the point $x=k_l=252$:

$$y_a=x=252$$

$$y_b=252(1+\log(252/252))=252$$

Further, the transfer curve 190 is also continuously differentiable at the breakpoint 200, as shown by the following equations for the transfer curve 190 at the point $x=k_l=252$:

$$y'_a = 1$$

$$y'_b = 252/252 = 1$$

In addition to the above features, the equation for the logarithmic portion 198 of the transfer curve 190 is such that the number of output code values per stop above the breakpoint 200 is constant, thereby maintaining a high image quality independent of the exposure level. This feature is illustrated by the data points 202, 204, 206, 208 on the transfer curve 190 which show that each time the input value doubles (e.g., x=500, 1000, 2000, and 4000), the output value is increased by a constant (e.g., by about 175 code values per stop). As can be appreciated, the example shown in FIG. 4 is exemplary and other similar encoding schemes may be used. For example, the number of bits for the input data may be different as well as the number of bits in the encoded output data.

Figure 5:
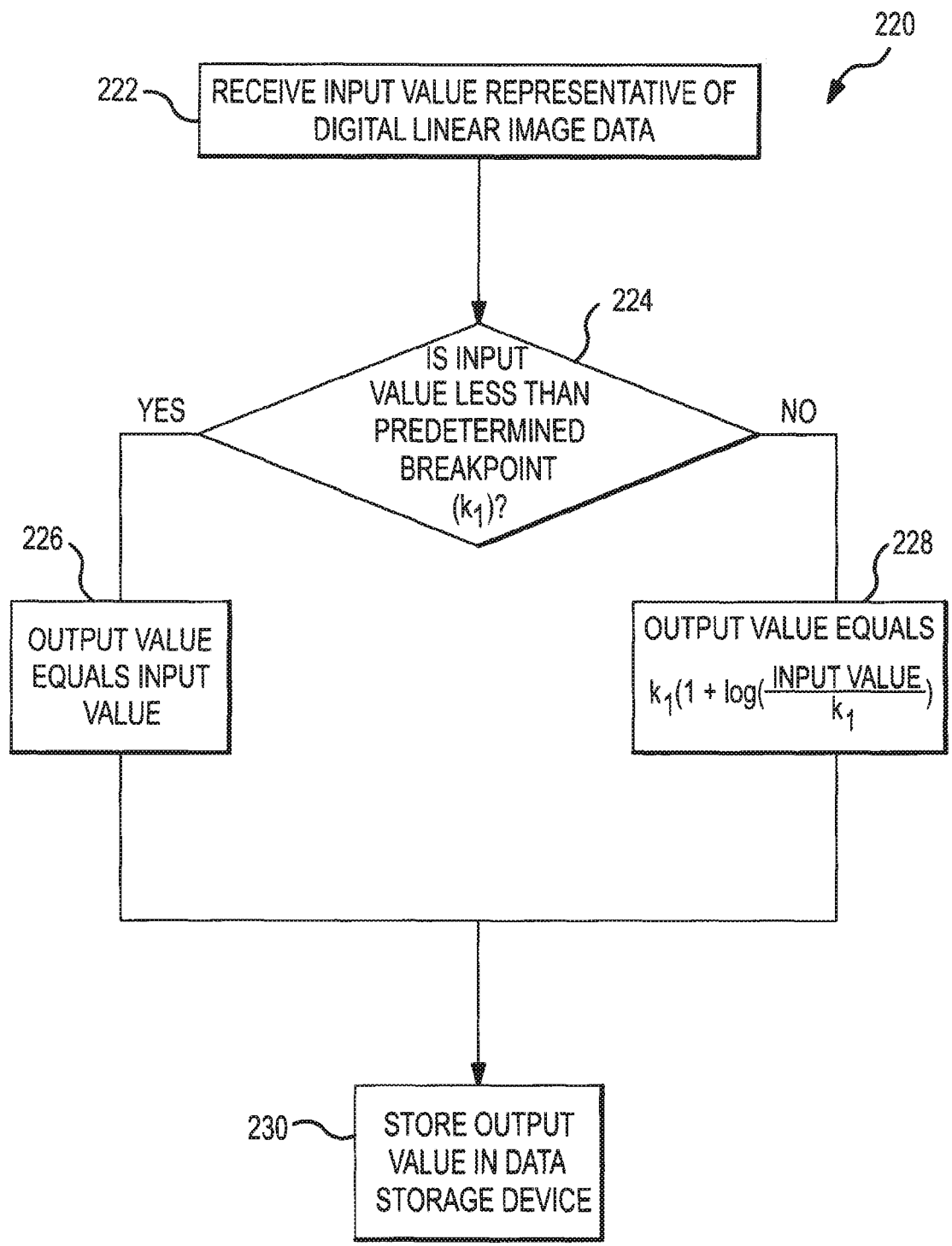
FIG. 5 illustrates a process for encoding digital linear image data into encoded image data using an enhanced encoding scheme.

FIG. 5 illustrates a process 220 for encoding digital linear image data into encoded image data. The process may be implemented in an encoder module in an image capture device such as a digital camera, film scanner, or the like. For example, the encoder module may be the encoder module 114 shown in FIG. 1. The encoder module may be a separate or integrated module within the image capture device. Additionally, the process 220 may be implemented in any computer where it may be desirable to encode digital linear image data utilizing the features described herein (e.g., in a workflow for editing motion pictures or other image data). As can be appreciated, the process 220 may be implemented in hardware, software, or any combination thereof.

The process 220 begins by first receiving a digital input value that is representative of digital linear image data (step 222). The digital input value may be data in a digital image file. For example, 12-bit linear image data may be received from an A/D converter, such as the A/D converter 110 shown in FIG. 1. Then, the process 220 may determine whether the received input value is less than a predetermined breakpoint $k_l$ (step 224). Step 224 may be performed, for example, to determine whether a linear function or a logarithmic function should be applied to the linear input value. If the input value is less than the breakpoint $k_l$, then a linear function is applied, and the output value is set equal to the received input value (step 226). That is, the linear function maps the input value directly to the same output value. Conversely, if the input value is not less than the breakpoint $k_l$, the output value is determined according to the following logarithmic transfer function (step 228):

$$\text{output\_value} = k_l(1 + \log(\text{input\_value}/k_l))$$

Once the output value has been determined, it may be stored in a data storage device, such as the memory 120 shown in FIG. 1, step 230. The data storage device may be any suitable storage device, including fixed or removable storage, optical or magnetic storage, or the like. As can be appreciated, the process 220 may be repeated for all the image data associated with one or more particular image files.

Figure 6:
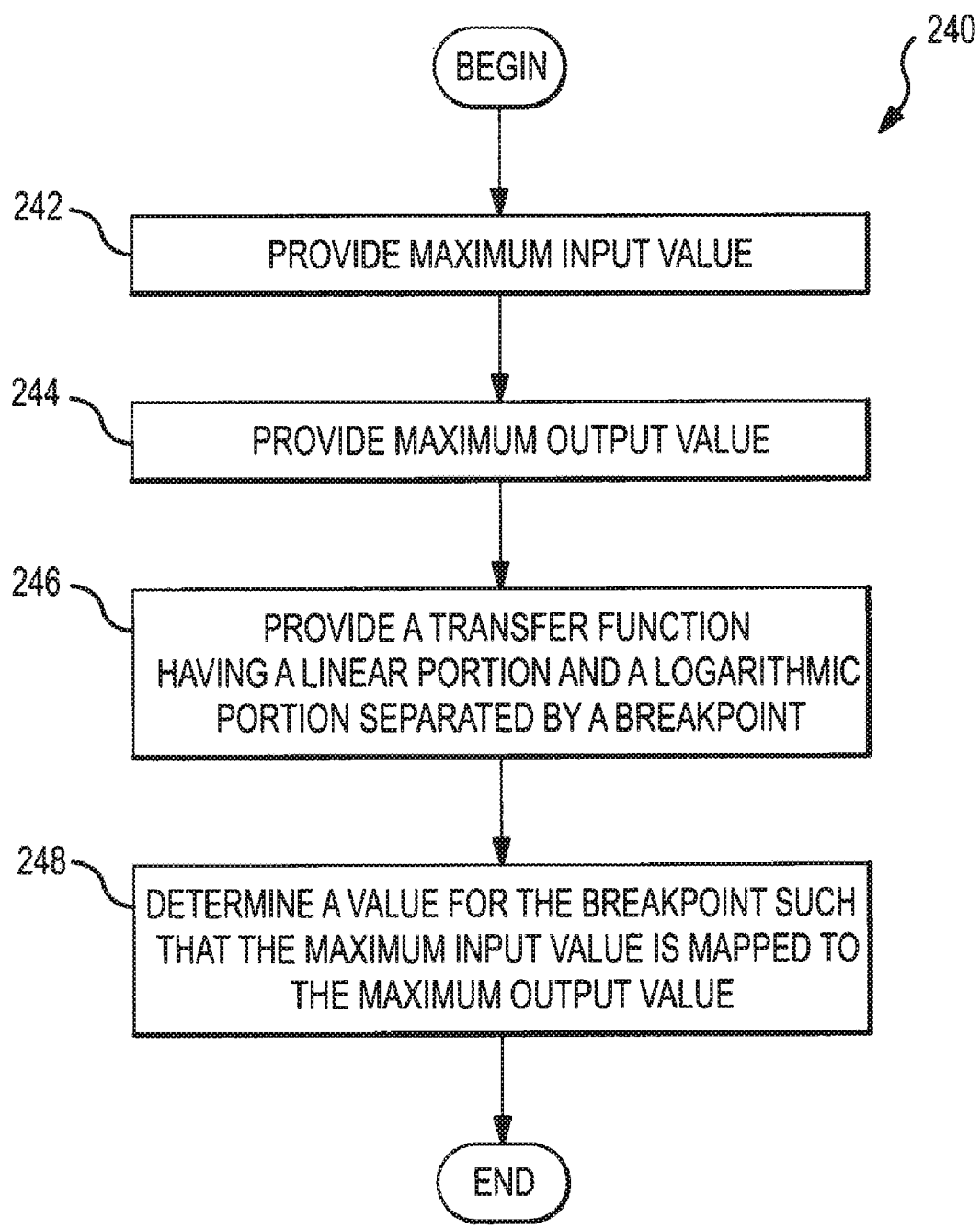
FIG. 6 illustrates a process for determining a breakpoint in a transfer function used to encode digital linear image data into encoded image data.

FIG. 6 illustrates a process 240 for determining the position of a breakpoint between a linear portion and a logarithmic portion of a transfer curve, such as the transfer curves 160 and 190 shown in FIG. 3 and FIG. 4, respectively. The process 240 may be performed by a developer of an encoder module (e.g., the encoder module 114 shown in FIG. 1), and may then be implemented in the encoder module using software, hardware, or a combination thereof. The process 240 includes providing a maximum input value (step 242). For example, in the case where the input values are 12 bits and have a range from 0 to 4095, the maximum input value may be 4095. Generally, the number of bits used for the input values is determined by the precision of the A/D converter used in the digital imaging system. The process 240 also includes providing a maximum output value (step 244). In the case where the encoded output values are each 10 bits and have a range of 0 to 1023, the maximum output value may be 1023, or some other value less than 1023. Generally, the maximum output value will be dependent on the desired bit depth of the encoded output values. Next, a transfer function may be provided that includes a linear portion and a logarithmic portion and is continuous at a breakpoint that separates the linear portion and the logarithmic portion (step 246). Then, using the transfer function, the maximum input value, and the maximum output value, a breakpoint may be determined such that the transfer function maps the maximum input value to the maximum output value (step 248), thereby utilizing the full dynamic range of the image data source (e.g., the A/D converter) that provides input values.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program may include any one or more processors of any kind of digital computer. Generally, a processor will receive instructions and data from a read-only memory or a random access memory or both. Generally, the elements of a computer are a processor for performing instructions and one or more memory devices for storing instructions and data. Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from, the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

I claim:

1. A computer-implemented method, comprising:
    receiving linear image data from an image data source, the linear image data including a plurality of input values each having a value between a minimum input value and a maximum input value;
    generating encoded image data by, for each input value, determining a corresponding output value according to a transfer function, each output value having a value between a minimum output value and a maximum output value; and
    storing the encoded image data in a data storage device;
    wherein the transfer function includes a linear portion and a logarithmic portion and is continuous at a breakpoint separating the linear portion from the logarithmic portion, the breakpoint calculated as an arithmetic combination of the maximum output value and a function of a ratio of the maximum output value to the maximum input value.

2. The computer-implemented method of claim 1, wherein the transfer function is continuously differentiable at the breakpoint.

3. The computer-implemented method of claim 1, wherein the output values generated when the input values are less than the breakpoint are equal to their corresponding input value.

4. The computer-implemented method of claim 1, further comprising:
    operating the transfer function to generate encoded image data that has a lower bit depth than the linear image data.

5. The computer-implemented method of claim 4, wherein the encoded data has a bit depth of 10 bits and the linear image data has a bit depth of 12 bits.

6. The computer-implemented method of claim 1, further comprising:
    for an input value that is equal to the maximum input value, generating an output value equal to the maximum output value using the transfer function.

7. The computer-implemented method of claim 1, wherein the breakpoint satisfies the equation: breakpoint=−(the maximum output value)/ProductLog(−(the maximum output value)/(the maximum input value*e)).

8. A system, comprising:
    an image capturing module operative to sense a light image of a scene and to generate digital linear image data that includes a plurality of linear pixel data;
    an encoder module operative to receive the digital linear image data and to encode the linear pixel data of the digital linear image data into encoded data according to a transfer function, wherein the transfer function includes a linear portion and a logarithmic portion and is continuous at a breakpoint separating the linear portion from the logarithmic portion, and wherein the breakpoint is calculated as an arithmetic combination of the maximum value of the encoded data and a function of a ratio of the maximum value of the encoded data to the maximum value of the linear pixel data; and
    a storage module for storing the encoded data.

9. The system of claim 8, wherein the transfer function utilized by the encoder module is continuously differentiable at the breakpoint.

10. The system of claim 8, wherein the linear portion of the transfer function utilized by the encoder module has a slope equal to one.

11. The system of claim 8, wherein the encoder module is operative to reduce the bit depth of the digital linear image data.

12. The system of claim 11, further comprising:
a processor communicatively coupled to the imaging capturing module and the storage module;
wherein the encoder module includes instructions executable on the processor.

13. The system of claim 8, wherein the image capturing module and the encoder module are part of a digital camera.

14. The system of claim 8, wherein the image capturing module and the encoder module are part of a film scanner.

15. The system of claim 8, wherein the transfer function utilized by the encoding module is operative to map the maximum value of the pixel data to the maximum value of the encoded data.

16. The system of claim 8, wherein the breakpoint satisfies the equation: breakpoint=−(the maximum value of the encoded data)/ProductLog(−(the maximum value of the encoded data)/(the maximum value of the linear pixel data*e)).

17. A non-transitory computer readable medium for encoding digital linear image data into encoded data, the computer readable medium comprising:
computer readable program code devices configured to cause a computer to receive digital linear image data that includes a plurality of linear pixel data, and
computer readable program code devices configured to cause the computer to determine an output value for each of the plurality of linear pixel data to generate encoded image data, wherein the output values are determined according to a transfer function that includes a linear portion and a logarithmic portion and is continuous at a breakpoint separating the linear portion from the logarithmic portion, and wherein the breakpoint is calculated as an arithmetic combination of the maximum output value and a function of a ratio of the maximum output value to the maximum value of the linear pixel data.

18. The non-transitory computer readable medium of claim 17, wherein the transfer function is continuously differentiable at the breakpoint.

19. The non-transitory computer readable medium of claim 17, wherein the linear portion of the transfer function has a slope equal to one.

20. The non-transitory computer readable medium of claim 17, wherein the breakpoint satisfies the equation: breakpoint=−(the maximum output value)/ProductLog(−(the maximum output value)/(the maximum value of the linear pixel data*e)).

\* \* \* \* \*

UNITED STATES PATENT AND TRADEMARK OFFICE
CERTIFICATE OF CORRECTION

PATENT NO. : 8,279,308 B1  
APPLICATION NO. : 12/512846  
DATED : October 2, 2012  
INVENTOR(S) : Lars U. Borg Page 1 of 1

It is certified that error appears in the above-identified patent and that said Letters Patent is hereby corrected as shown below:

On the title page, Item (56), under "Other Publications", line 3, before "Grayscale", insert --"--, therefor On the title page, Item (56), under "Other Publications", line 4, after "Recording,", insert --"--, therefor In column 11, line 26, in claim 17, after "data", Delete "," and insert --;--, therefor Signed and Sealed this
Twelfth Day of February, 2013

Teresa Stanek Rea
*Acting Director of the United States Patent and Trademark Office*